Sept. 17, 1957  S. A. DE LORENZO  2,806,892
RECOVERING TRIMETHYLOLETHANE BY ETHYL ACETATE EXTRACTION
Filed June 2, 1954
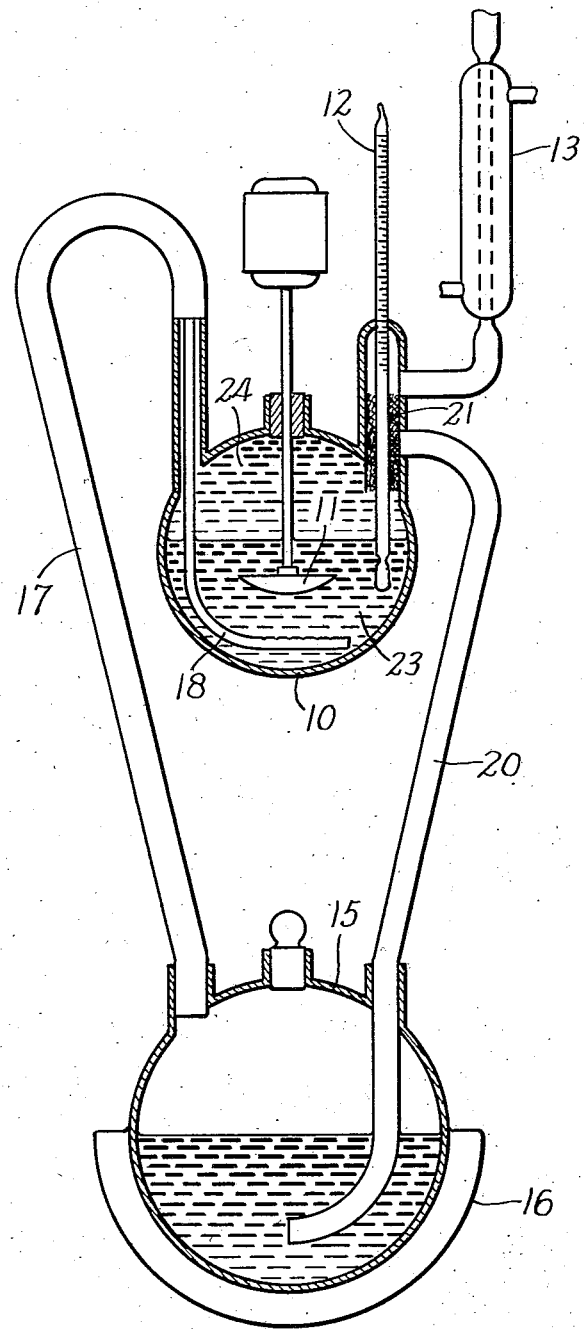
INVENTOR
Sylvio A. DeLorenzo
BY
D. Cameron Ford
ATTORNEY

2,806,892

RECOVERING TRIMETHYLOLETHANE BY ETHYL ACETATE EXTRACTION

Sylvio A. De Lorenzo, Trenton, N. J., assignor to Heyden Newport Chemical Corporation, New York, N. Y., a corporation of Delaware Application June 2, 1954, Serial No. 433,958

3 Claims. (Cl. 260—637)

The present invention relates to a novel method of recovering relatively pure trimethylolethane from aqueous liquors containing in addition to trimethylolethane, metal formate and impurities of the type produced by condensing formaldehyde and propionaldehyde in water in the presence of a strongly alkaline, water soluble hydroxide.

Trimethylolethane is produced by the condensation of formaldehyde with propionaldehyde in an aqueous medium and in the presence of a strongly alkaline, water soluble material which maintains the reaction alkaline and also enters into the reaction. The course of the reaction is as follows:

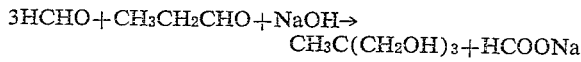

$3HCHO + CH_3CH_2CHO + NaOH \rightarrow CH_3C(CH_2OH)_3 + HCOONa$

Preferably, an excess of formaldehyde and of alkaline material over and above the stoichiometric quantities indicated is used to increase the yield based on the quantity of propionaldehyde used. Other water soluble alkali metal or alkaline earth metal compounds may be used. The stronger alkaline compounds are preferred with sodium hydroxide or calcium hydroxide being used most commonly for this purpose. The aqueous reaction liquor contains, in addition to the trimethylolethane, metal formate (sodium formate), formaldehyde and complex impurities resulting from side reactions that materially lower the melting point of the trimethylolethane if present in the final product.

It is very difficult, if not impossible, to recover satisfactorily the trimethylolethane directly from the aqueous reaction liquor. It has been proposed that trimethylolethane be recovered by evaporating the reaction liquor substantially to dryness and then extracting the trimethylolethane from the dry product with a solvent such as acetone, dioxane, or isopropanol. Such processes have serious drawbacks, including the cost and difficulties involved in evaporating off a large amount of water present. More serious drawbacks are that the crude product is highly contaminated with impurities, particularly the impurities which lower the melting point, and the percentage recovered is unduly low.

Accordingly, it is the purpose of the present invention to provide a method of recovering trimethylolethane from aqueous reaction liquors in a relatively pure condition with the percentage recovered being sufficiently high to render the process commercially feasible.

It has been discovered that the trimethylolethane can be extracted from aqueous reaction liquors by means of ethyl acetate and the trimethylolethane then recovered in a relatively pure condition by crystallization from the ethyl acetate extract at a relatively high yield, despite the fact that ethyl acetate is a poor solvent for trimethylolethane. While ethyl acetate is a poor solvent for trimethylolethane, it has been found that ethyl acetate is a poorer solvent for the impurties and particularly for those complex impurities which lower the melting point of the trimethylolethane so that with ethyl acetate a high degree of purification can be effected at a high rate of recovery.

Preferably, though not necessarily, and in order to reduce the quantity of solvent required and to increase the recovery of trimethylolethane, the trimethylolethane reaction liquor is continuously extracted with a relatively small amount of ethyl acetate which is subsequently recycled for extracting a further quantity of trimethylolethane. This process can be carried out substantially continuosly and the amount of ethyl acetate used for extracting a given quantity of reaction liquor may be less than the amount of solvent required to dissolve at 25° C., the trimethylolethane present in the reaction liquor. While utilizing a small quantity of ethyl acetate is not essential, it is an important factor in the economy of the process and greatly reduces the cost. The quantity of solvent used is a matter of economy and is not critical insofar as operativeness is concerned.

Prior to extraction of the trimethylolethane, the excess sodium hydroxide or other alkaline, metal hydroxide is preferably neutralized with acid, for example, formic acid. The formaldehyde content of the reaction liquor may be reduced by heating the liquor prior to neutralization, particularly if the formaldehyde content is in excess of 0.5%. If unduly large amounts of water are present, it may be desirable to concentrate the reaction liquor by evaporating part of the water. If some of the formate precipitates, it may be removed by filtration. However, if this is done, the trimethylolethane continues to stay in solution and the amount of water removed is small compared to the amount which would have to be removed to evaporate the reaction liquor to dryness.

These and other advantages of the present process will become more readily apparent from the following examples in which all parts are by weight, although, it is to be understood that the present invention is not limited to the particular conditions set forth unless so stated in the present specification or accompanying claims.

The accompanying drawing illustrates one type of apparatus suitable for carrying out the present process and of the type used in the following examples. However, the present process is not limited to any particular type of apparatus. The apparatus includes a first flask 10 adapted to receive a quantity of reaction liquor and equipped with a motor driven agitator 11, a thermometer 12 and a condenser 13 adapted to be cooled with water or other suitable cooling medium. A second reservoir flask 15 provided with a suitable heating element 16 is in communication with flask 10 through tube 17 which terminates in a relatively small tube 18 extending into a lower portion of the flask 10. A second tube 20 connects flasks 10 and 15 and a metal screen 21 preferably is interposed in the outlet of flask 10 ahead of the inlet end of tube 20. In operation, aqueous reaction liquor is first placed in flask 10 along with a relatively small quantity of ethyl acetate. Additional ethyl acetate is placed in flask 15. The stirrer 11 is started to bring the ethyl acetate in flask 10 into intimate contact with the reaction liquor so that the ethyl acetate will dissolve the trimethylolethane. The reaction liquor collects as aqueous phase in a lower layer 23 while the ethyl acetate-trimethylolethane solution separates into an upper solvent phase or layer 24. When heat is applied by means of heating element 16 to flask 15, ethyl acetate vapors flow through tube 17 and then into flask 10 through tube 18. As soon as flask 10 is full, if not filled at the start, ethyl acetate extract containing dissolved trimethylolethane will flow past screen 21 and through tube 20 into flask 15. The screen 21 tends to prevent admixed water drops from flowing out of the flask 10 along with the ethyl acetate extract. As this procedure is continued, the trimethylolethane is progressively and continuously extracted from the aqueous reaction liquor and the amount of trimethylolethane in flask 15 gradually increases. After the trimethylolethane has been extracted and if the ethyl acetate-trimethylolethane solution in flask 15 is allowed to cool, the trimethylolethane will precipitate and if this occurs, the ethyl acetate extract is preferably heated to redissolve any precipitated trimethylolethane. The hot solution produced in flask 15 is gradually cooled to crystallize the trimethylolethane. The crystallized trimethylolethane may be readily separated from the ethyl acetate mother liquor by filtration or other suitable means. A second crop of crystals may be obtained by concentrating the ethyl acetate mother liquor and then cooling.

Example I

An aqueous trimethylolethane reaction liquor was produced by adding 200 parts (3.45 moles) of propionaldehyde to a mixture of 1210 parts (12.1 moles) of 30% aqueous formaldehyde solution and 364 parts (4.55 moles) of 50% aqueous sodium hydroxide solution over a period of two hours. During this period the temperature was maintained at 19–25° C. The resulting reaction liquor was heated at 55° C. for nine hours to reduce its formaldehyde content to 0.5% and was then neutralized with 18.5 parts of formic acid. In this manner there was obtained 1837 parts of neutralized aqueous reaction liquor having a specific gravity of 1.12 at 50° C.

A mixture of 532.4 parts of this reaction liquor and 530 parts of ethyl acetate was placed in extractor 10 and an additional 783 parts of ethyl acetate was placed in the reservoir 15. The extraction was carried out over a period of 12 hours during which the temperature was maintained at about 55–60° C., in extractor 10. Ethyl acetate-trimethylolethane extract was continuously removed from extractor 10 through tube 20 to reservoir 15 and ethyl acetate was continuously distilled off from reservoir 15 with the ethyl acetate flowing through tubes 17 and 18 into extractor 10. After the extraction was completed, the temperature of the ethyl acetate extract was raised to dissolve all of the solids and the heated solution was then transferred to a crystallizing vessel where it was cooled slowly to room temperature. The precipitated trimethylolethane was isolated by filtration, washed with 25 parts of ethyl acetate and dried. The dried trimethylolethane contained 0.17% ash and melted at 196–199° C..

Example II

The reaction liquor was prepared in substantially the same manner as described in Example I except that propionaldehyde was added to the formaldehyde-sodium hydroxide solution over a 2 hour period during which the maximum temperature was 35° C. The resulting mixture was heated at 55° C. until its formaldehyde content was approximately 0.15%, after which the liquor was neutralized with formic acid.

One thousand parts of this reaction liquor and 1350 parts of ethyl acetate were placed in extractor 10 and 900 parts of ethyl acetate were placed in reservoir 15. The extraction was carried out at a temperature of about 50–60° C., over a 12 hour period. The resulting ethyl acetate-trimethylolethane extract was cooled slowly to room temperature and the trimethylolethane was allowed to crystallize for 24 hours. The trimethylolethane was separated from the ethyl acetate liquor by filtration and this crop melted at 199–201° C. The ethyl acetate liquor was then concentrated and cooled to produce the second crop of trimethylolethane melting at 197–199° C. The total yield of pure trimethylolethane so obtained was 71% of the theoretical based on the amount of propionaldehyde. Additional material was obtained by further concentrating the ethyl acetate liquor but this material was less pure although it was suitable for future purification treatment.

I claim:

1. In a process of recovering trimethylolethane from aqueous liquors containing, in addition to trimethylolethane, metal formate and other impurities resulting from the condensation of formaldehyde and propionaldehyde in an aqueous medium containing a compound selected from the group consisting of alkali metal and alkaline earth metal hydroxides, the steps comprising extracting such an aqueous liquor with hot ethyl acetate and thereby forming an ethyl acetate-trimethylolethane extract, and thereafter recovering trimethylolethane from the extract.

2. In a process of recovering trimethylolethane from a trimethylolethane aqueous reaction liquor resulting from the condensation of formaldehyde with propionaldehyde in an aqueous medium and in the presence of a compound selected from the group consisting of alkali metal and alkaline earth metal hydroxides, extracting such a reaction liquor with hot ethyl acetate and forming a hot ethyl acetate extract containing dissolved trimethylolethane extracted from the liquor, cooling the extract and crystallizing the trimethylolethane and separating the crystallized trimethylolethane from the ethyl acetate mother liquor.

3. In the process of progressively recovering trimethylolethane from an aqueous reaction liquor resulting from the condensation of formaldehyde with propionaldehyde in an aqueous medium and in the presence of sodium hydroxide, the steps comprising initially contacting a quantity of such a reaction liquor in an extraction zone with a quantity of ethyl acetate insufficient to dissolve the trimethylolethane present in the liquor at 25° C., continuously removing ethyl acetate-trimethylolethane extract from the extraction zone, continuously removing solvent from the extract by distillation and returning the removed solvent to the extraction zone and into contact with the reaction liquor for extracting a further quantity of trimethylolethane, and thereafter recovering trimethylolethane from the ethyl acetate-trimethylolethane extract.

References Cited in the file of this patent
UNITED STATES PATENTS

| | | |
|---|---|---|
| 2,292,926 | Brubaker et al. | Aug. 11, 1942 |
| 2,347,312 | Cox | Apr. 25, 1944 |